| (12) | United States Patent | (10) Patent No.: | US 10,588,105 B2 |
|---|---|---|---|
| | Yi et al. | (45) Date of Patent: | Mar. 10, 2020 |

(54) METHOD AND USER EQUIPMENT DEVICE FOR REGISTERING IN WIRELESS COMMUNICATION SYSTEM

(71) Applicant: LG ELECTRONICS INC., Seoul (KR)

(72) Inventors: Seungjune Yi, Seoul (KR); Hanul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/870,445

(22) Filed: Jan. 12, 2018

(65) Prior Publication Data

US 2018/0199302 A1    Jul. 12, 2018

Related U.S. Application Data

(60) Provisional application No. 62/445,722, filed on Jan. 12, 2017.

(51) Int. Cl.

| H04W 60/00 | (2009.01) |
| H04W 36/00 | (2009.01) |
| H04W 76/15 | (2018.01) |
| H04W 76/34 | (2018.01) |
| H04W 88/06 | (2009.01) |
| H04W 36/14 | (2009.01) |

(52) U.S. Cl.

CPC ..... *H04W 60/005* (2013.01); *H04W 36/0022* (2013.01); *H04W 76/15* (2018.02); *H04W 76/34* (2018.02); *H04W 36/14* (2013.01); *H04W 88/06* (2013.01)

(58) Field of Classification Search

CPC ............... H04W 60/005; H04W 76/15; H04W 36/0022; H04W 36/14; H04W 76/34; H04W 88/06

See application file for complete search history.

(56) References Cited

U.S. PATENT DOCUMENTS

| 2010/0260143 | A1* | 10/2010 | Tanabe | H04W 36/0022 370/331 |
| 2011/0194530 | A1* | 8/2011 | Tinnakornsrisuphap | H04W 36/04 370/331 |
| 2011/0310844 | A1* | 12/2011 | Rexhepi | H04W 36/005 370/331 |
| 2013/0203452 | A1* | 8/2013 | Awoniyi | H04W 52/0203 455/500 |
| 2013/0287012 | A1* | 10/2013 | Pragada | H04W 76/25 370/338 |
| 2018/0132141 | A1* | 5/2018 | Huang-Fu | H04L 65/1016 |

* cited by examiner

*Primary Examiner* — Joseph E Dean, Jr.

(74) *Attorney, Agent, or Firm* — Lee Hong Degerman Kang Waimey

(57) ABSTRACT

A user equipment (UE) can perform dual registration with different radio access technology (RAT) system. The UE registers with a core network of a second system independent of a first system while maintaining registration with a core network of the first system. The UE transmits, to the second system, first information indicating that the UE has the registration with the first system when connecting to the second system. One of the first and second systems may be a LTE system using a first radio access technology (RAT), and the other one may be new RAT system using a second RAT different from the first RAT.

14 Claims, 15 Drawing Sheets

(a) Control-Plane Protocol Stack (b) User-Plane Protocol Stack

METHOD AND USER EQUIPMENT DEVICE FOR REGISTERING IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/445,722, filed on Jan. 12, 2017, the contents of which are hereby incorporated by reference herein in its entirety.

TECHNICAL FIELD

The present invention relates to a wireless communication system, and more particularly, to a method and apparatus for registering in a wireless communication system.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

SUMMARY

In an aspect of the present invention, provided herein is a method of registering, by a user equipment (UE), with a wireless communication system. The method comprises: registering, with a core network of a second system independent of a first system while maintaining registration with a core network of the first system; and transmitting, by the UE to the second system, first information indicating that the UE has the registration with the first system when connecting to the second system. One of the first and second systems may be a LTE system using a first radio access technology (RAT), and the other one may be a new RAT system using a second RAT different from the first RAT.

In another aspect of the present invention, provided herein is a user equipment (UE) for registering with a wireless communication system. The UE comprises a radio frequency (RF) unit, and a processor configured to control the RF unit. The processor may register with a core network of a second system independent of a first system while maintaining registration with a core network of the first system;

and control the RF unit to transmit, to the second system, first information indicating that the UE has the registration with the first system when connecting to the second system. One of the first and second systems may be a LTE system using a first radio access technology (RAT), and the other one may be a new RAT system using a second RAT different from the first RAT.

In each aspect of the present invention, the UE may receive a command for the UE to register in the second system while maintaining registration with the core network of the first system. The UE may register with the core network of the second system based on the command.

In each aspect of the present invention, the UE may decide to register with the core network of the second system in addition to the registration with the core network of the first system.

In each aspect of the present invention, the UE may transmit to one of the first and second systems, second information indicating that the UE detaches from the other one of the first and second systems when the UE detaches from the other one of the first and second systems.

In each aspect of the present invention, the UE may receive, from the one of the first and second systems, a detach command for the UE to detach from the other one of the first and second systems. The UE may detach from the other one of the first and second systems based on the detach command.

In each aspect of the present invention, the UE may decide to detach from the other one of the first and second systems.

The above technical solutions are merely some parts of the embodiments of the present invention and various embodiments into which the technical features of the present invention are incorporated can be derived and understood by persons skilled in the art from the following detailed description of the present invention.

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a BS may be reduced.

Also, signals in a new radio access technology system can be transmitted/received effectively.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWING

The accompanying drawings, which are included to provide a further understanding of the invention, illustrate embodiments of the invention and together with the description serve to explain the principle of the invention.

DETAILED DESCRIPTION

Figure 1:
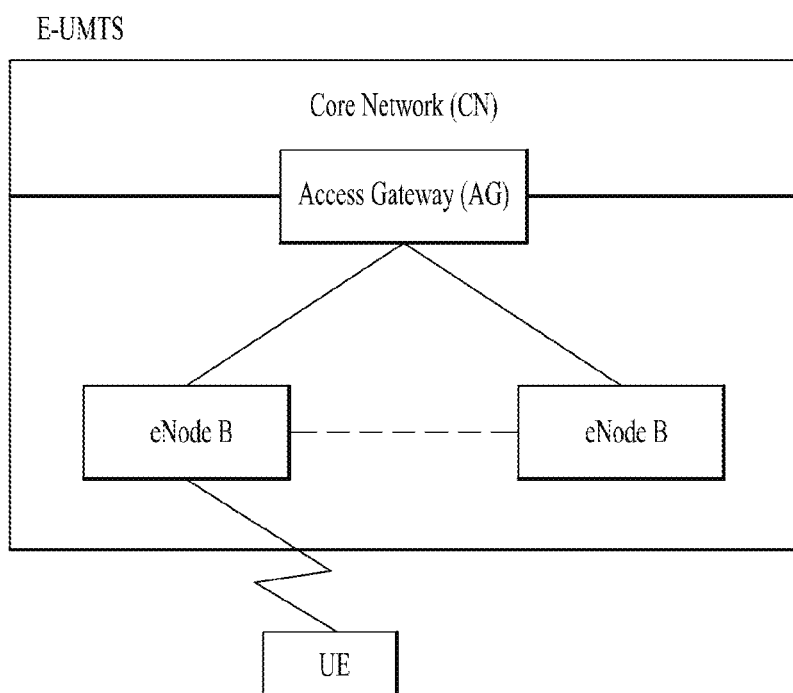
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through a contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321, 3GPP TS 36.322, 3GPP TS 36.323 and 3GPP TS 36.331 may be referenced.

Figure 2:
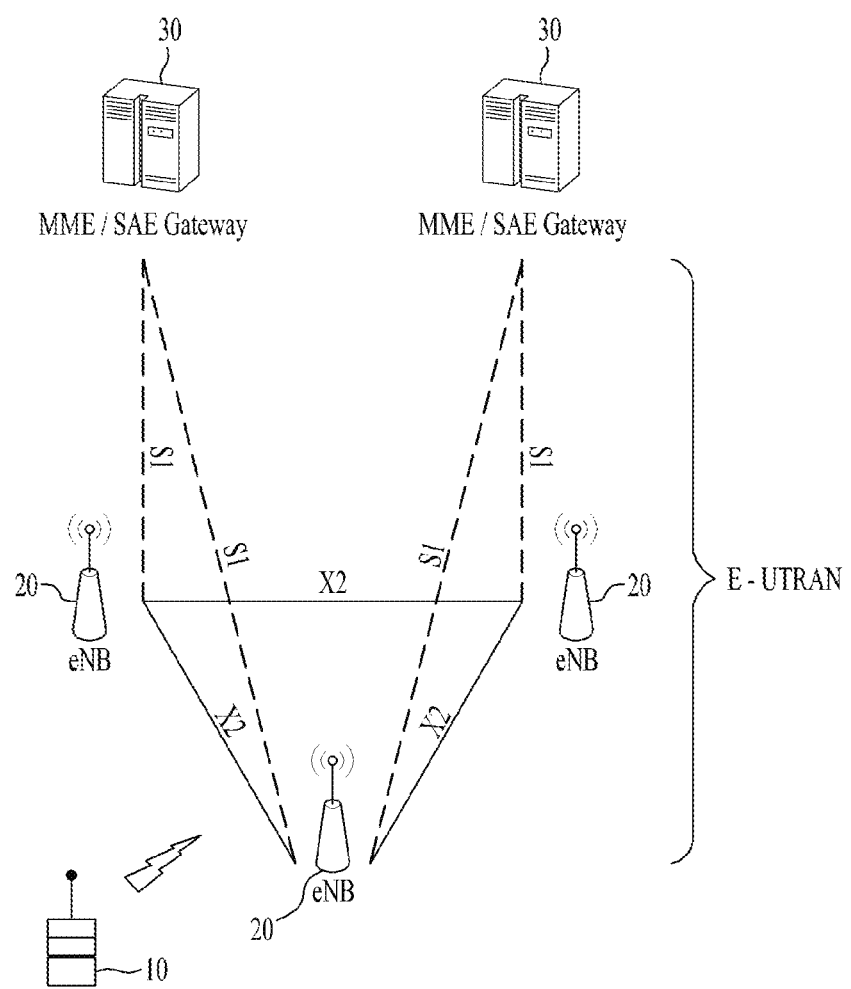
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
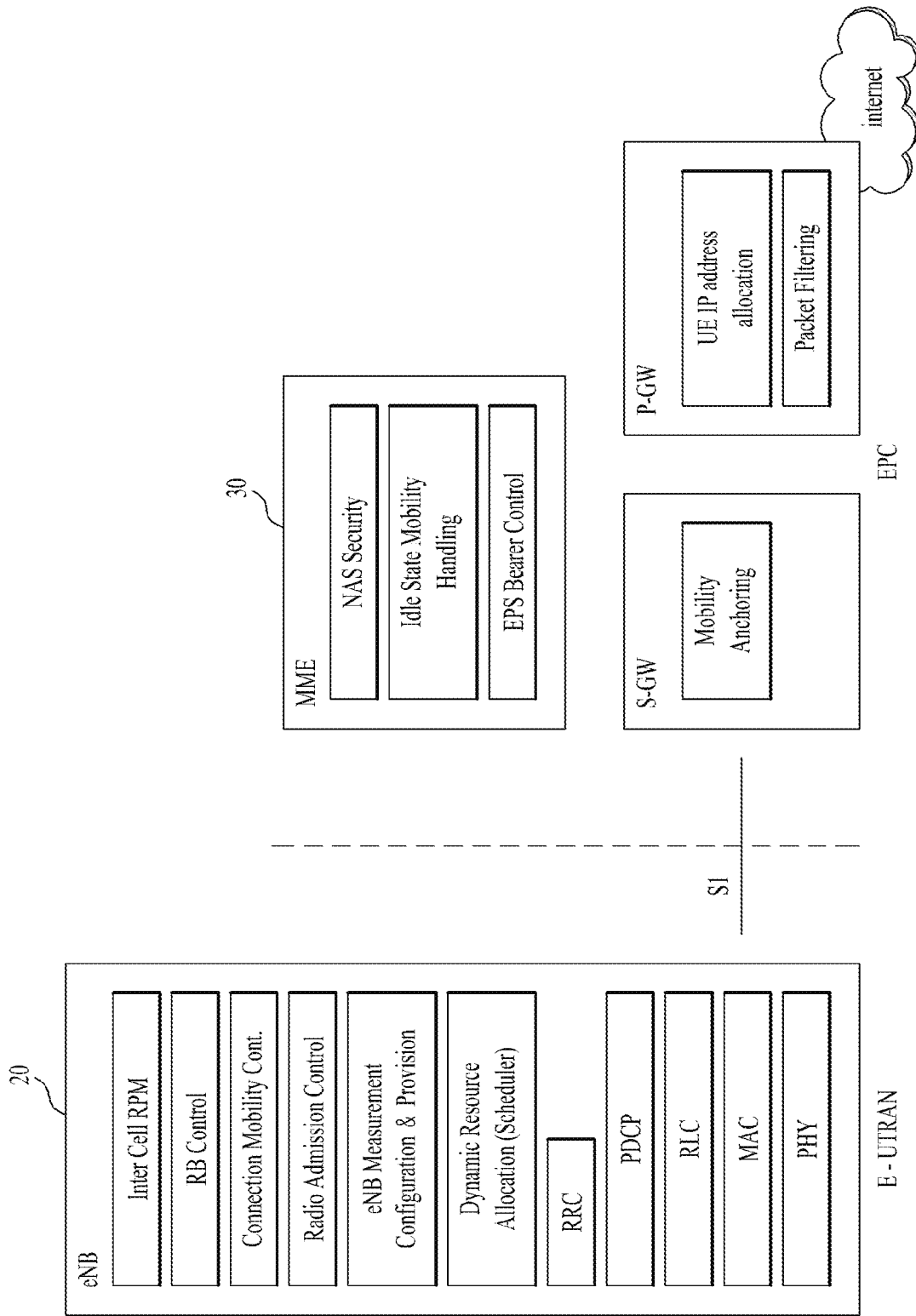
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW (P-GW) and Serving GW (S-GW) selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
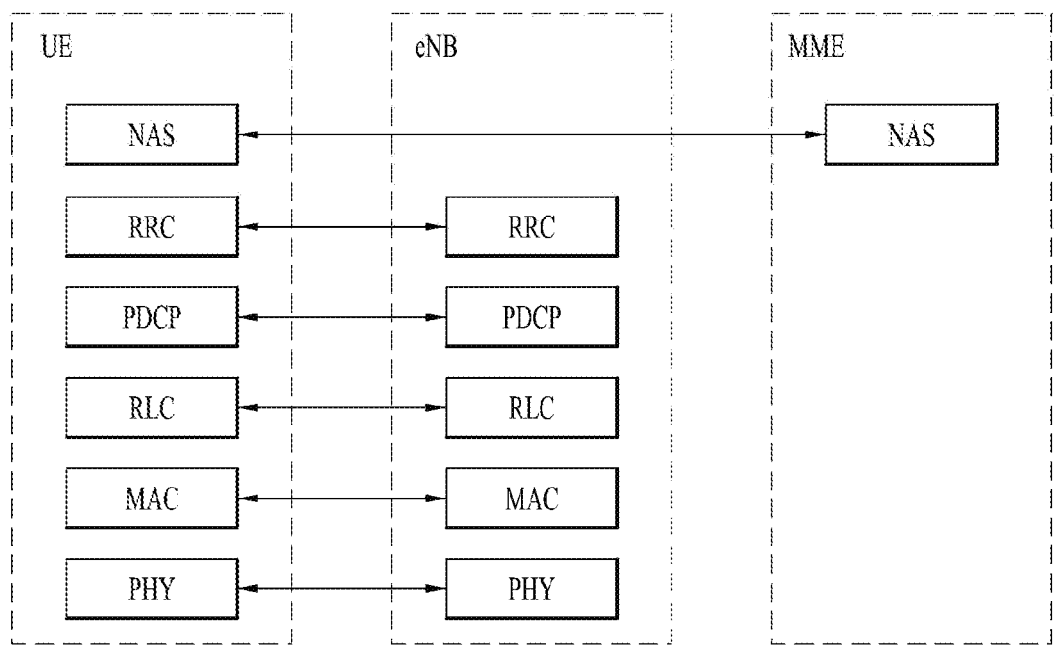
FIG. 4 is a diagram showing a control plane and a user plane of a radio interface protocol between a UE and an E-UTRAN based on a 3GPP radio access network standard.
Figure 4:
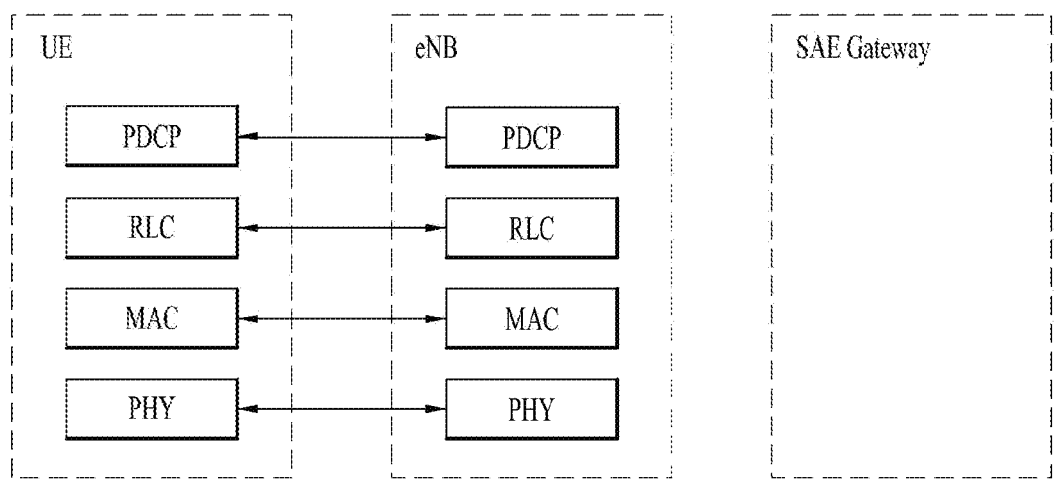

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
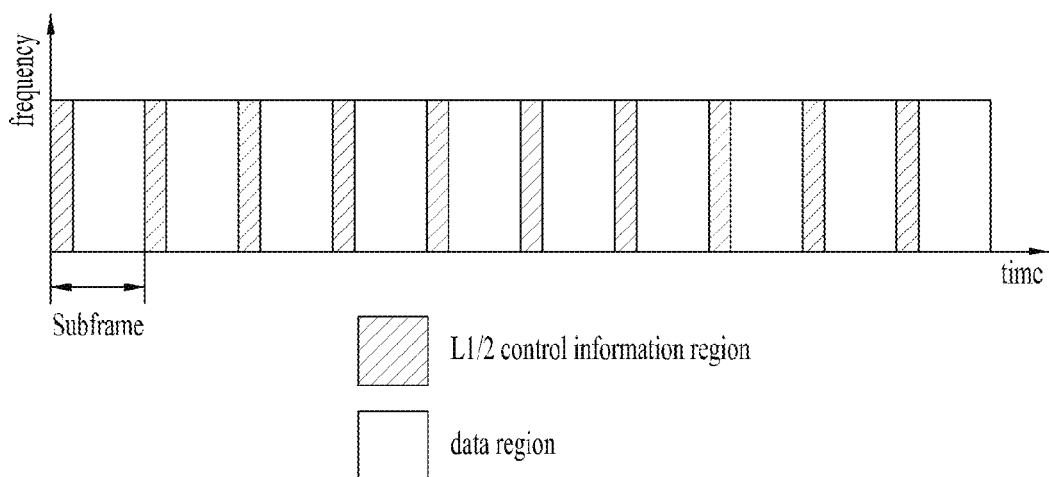
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 6:
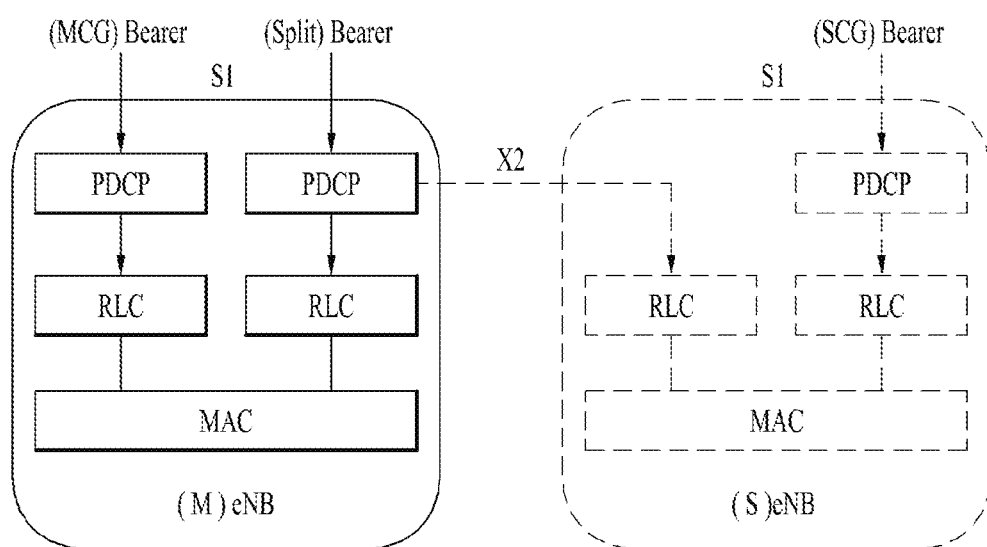
FIG. 6 illustrates an example of the radio protocol architecture used in the LTE/LTE-A system.

FIG. 6 illustrates an example of the radio protocol architecture used in the LTE/LTE-A system.

Referring to FIG. 6, in view of one eNB, there is 1 PDCP entity and 1 RLC entity configured for 1 radio bearer. In other words, in the LTE/LTE-A system, one RLC entity is connected to one PDCP entity, and used for only one radio bearer.

Meanwhile, E-UTRAN supports dual connectivity (DC) operation whereby a multiple Rx/Tx UE in RRC_CONNECTED is configured to utilize radio resources provided by two distinct schedulers, located in two eNBs connected via a non-ideal backhaul over the X2 interface. The overall E-UTRAN architecture as depicted in FIG. 2 is applicable for DC as well. eNBs involved in DC for a certain UE may assume two different roles: an eNB may either act as a master eNB (MeNB) or as a secondary eNB (SeNB). The MeNB terminates at least S1-MME, and the SeNB is providing additional radio resources for the UE but is not the MeNB. If UE is configured with DC, the UE is connected to one MeNB and one SeNB, and configured with a master cell group (MCG) and a secondary cell group (SCG). The MCG is a group of serving cells associated with the MeNB, comprising of the PCell and optionally one or more SCells, and the SCG is a group of serving cell associated with, comprising of a primary SCell (PSCell) optionally one or more SCells. In DC, there is the X2 interface between the MeNB and the SeNB. Therefore, in DC, the MeNB and the SeNB can recognize whether a UE is in DC or not.

As more communication devices demand larger communication capacity, efficient use of a limited frequency band in a future wireless communication system becomes increasingly important. Even in a cellular communication system such as a 3GPP LTE/LTE-A system, a method of using, for traffic offloading, an unlicensed band such as a band of 2.4 GHz used by a legacy Wi-Fi system or an unlicensed band such as a band of 5 GHz, which is newly in the spotlight, is under consideration. There are two approaches using the unlicensed band. One is transmitting/receiving data on an unlicensed band using the LTE technology, and the other one is transmitting/receiving data by binding different radio technologies (e.g., LTE and WLAN).

Figure 7:
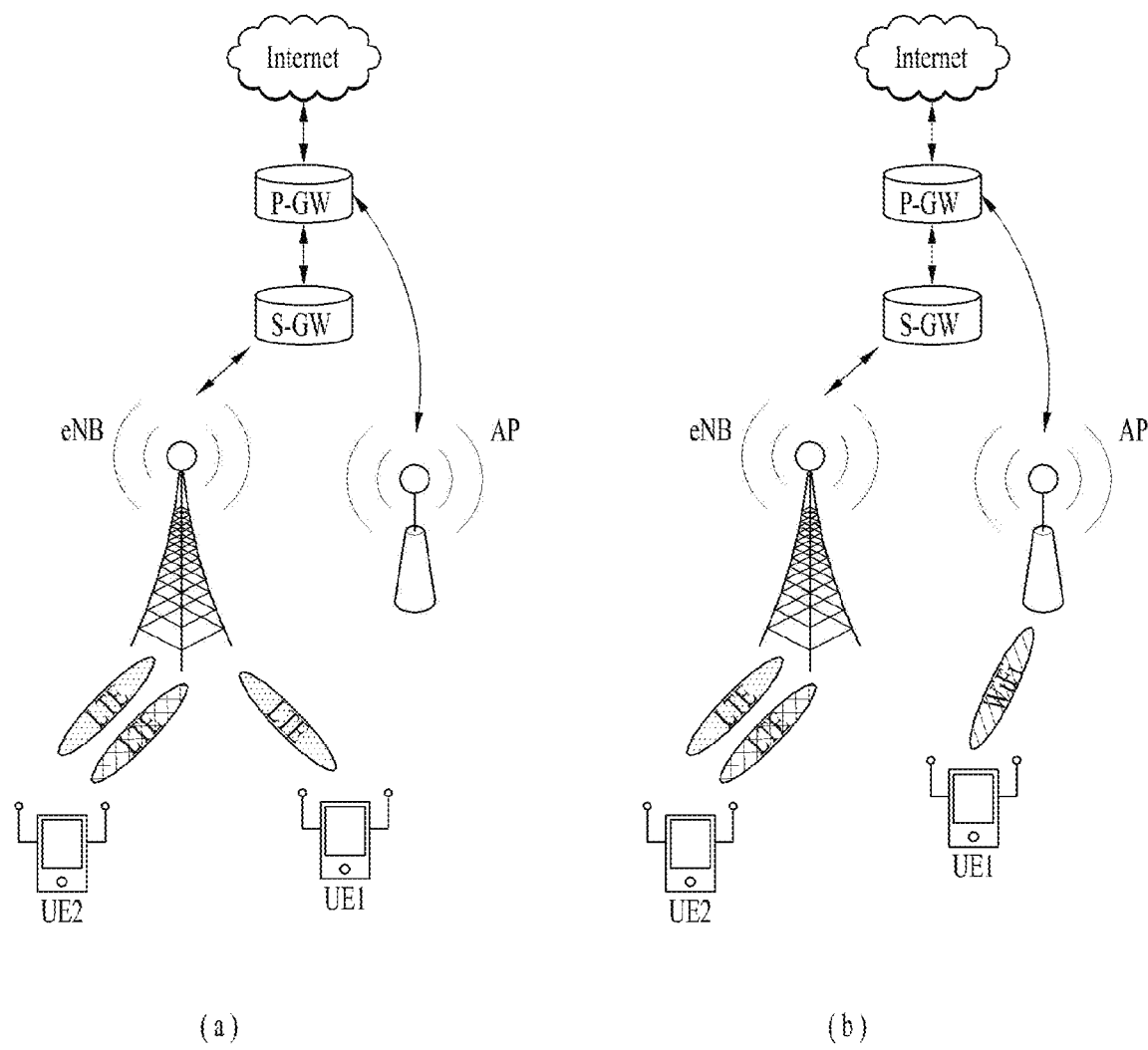
FIG. 7 illustrates the flow of (downlink/uplink) signals between a UE and a network node(s) in a conventional system.

FIG. 7 illustrates the flow of (downlink/uplink) signals between a UE and a network node(s) in a conventional system.

In the case of downlink signaling, the P-GW sends the signal transmitted with the LTE technology to the S-GW/eNB and sends the signal transmitted with the WiFi technology (without passing through the S-GW and any eNB) to the WiFi access point (AP). The UE receives signals for the UE on one or more licensed bands using the LTE technology, or receives signals for the UE on an unlicensed band using the WiFi technology.

In case of uplink signaling, signals using the LTE technology are transferred to an P-GW via an eNB and an S-GW on the licensed band, and signals using the WiFi technology are transferred on the unlicensed band (without going through an eNB and an S-GW) to the P-GW.

Figure 8:
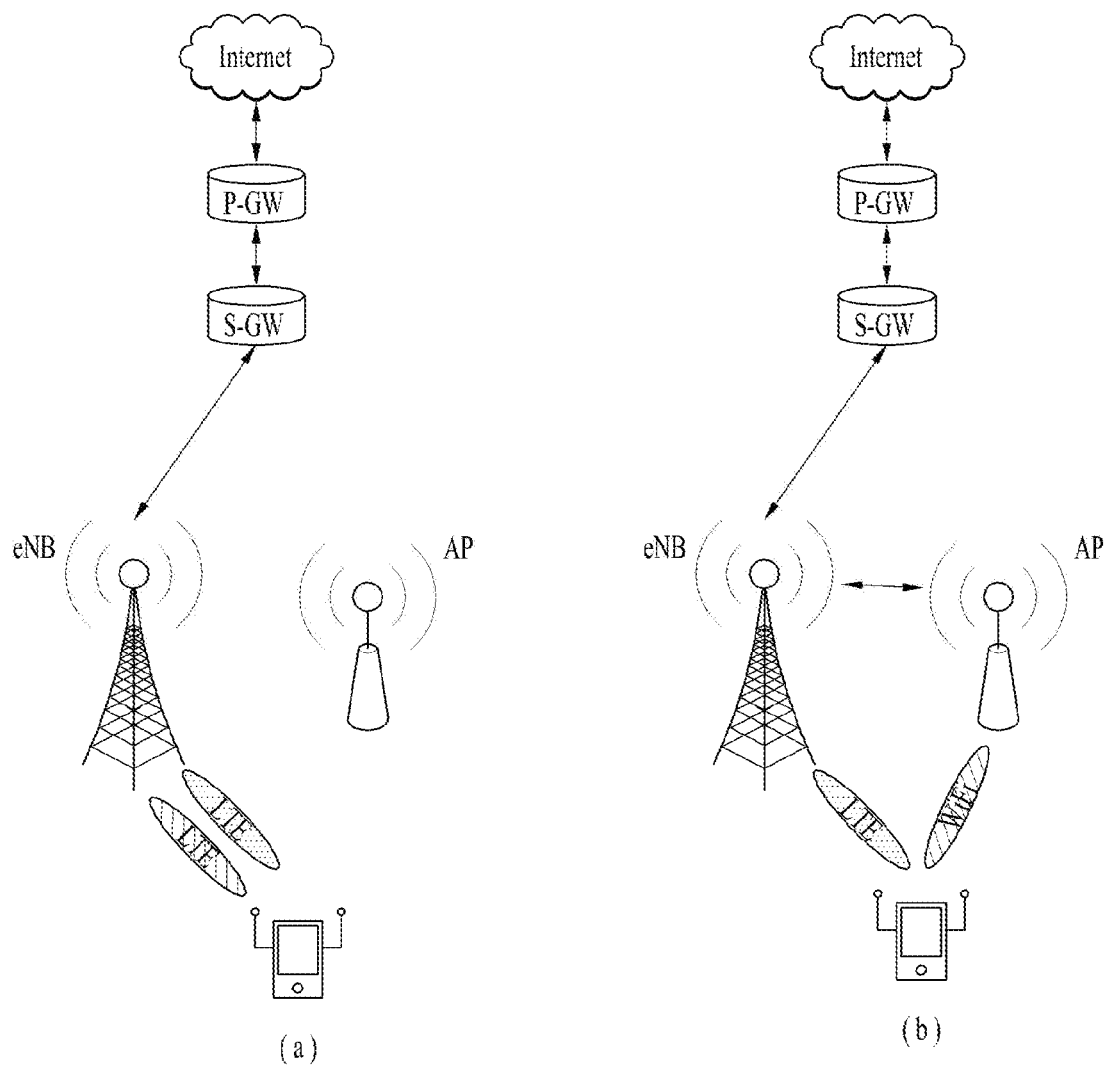
FIG. 8 illustrates the flow of (downlink/uplink) signals between a UE and a network node(s) in an enhanced wireless communication system.

FIG. 8 illustrates the flow of (downlink/uplink) signals between a UE and a network node(s) in an enhanced wireless communication system. In particular, FIG. 8(a) is shown to illustrate the concept of a licensed assisted access (LAA), and FIG. 8(b) is shown to illustrate the concept of LWA (LTE-WLAN aggregation).

In the current WiFi system, an unlicensed band that is not dedicated to a specific operator is used for communication. In such an unlicensed band, any wireless technology can be used if it is based on a certain standard, for example, adopting a technique that causes no interference or minimizes interference to the wireless channel, and uses less than a certain output power. Therefore, there is a move to apply the technology currently used in cellular networks to the unlicensed band, which is called LAA. In order to increase the user's satisfaction by providing services even in the unlicensed band as the number of users using mobile data explosively increases compared to the frequencies (i.e., the licensed band(s)) currently held by each wireless communication service provider. The introduction of LAA into LTE systems is being considered. According to the LAA, the LTE radio frequency can be extended to a frequency band not specified by 3GPP, i.e., an unlicensed band. The WLAN band can be a major target band for the application of the LAA. Referring to FIG. 8(a), when a band A, which is a licensed band for a UE, and a band B, which is an unlicensed band, are aggregated, the eNB may transmit a downlink signal on the band A or on the band B to the UE using the LTE technology. Likewise, when a band A, which is a licensed band and a band B, which is an unlicensed band for the UE, are aggregated, the uplink signal transmitted to the network by the UE is transmitted on the band A or on the band B from the UE to the eNB (or to a remote radio header (RRH)/remote radio unit (RRU) of the eNB) using the LTE technology.

On the other hand, in the existing LTE system, uplink/downlink communication is performed between the UE and the network node using only LTE technology on the plurality of frequency bands even if a plurality of frequency bands are aggregated for communication with the UE. In other words, the LTE link was the only communication link the UE could use at different frequencies at the same time. Another way to reduce congestion on the licensed band is to use LTE and WiFi technologies at different frequencies simultaneously to communicate between the UE and the network node. This technique is called LWA. According to the LWA, a WLAN radio spectrum and a WLAN AP are used for communication with the UE together with the LTE radio spectrum and LTE nodes (eNB, RRH, RRU, etc.). Referring to FIG. 8(b), the eNB may transmit the downlink signal for the UE directly to the UE using the LTE technology on the band A, which is a license band configured for the UE, or may transmit the downlink signal to the AP. The eNB may send LTE data to the AP and control the AP. The AP may transmit the downlink signal for the UE to the UE using the WiFi technology on the band B, which is an unlicensed band, under the control of the eNB. Similarly, when the band A and the band B are configured in the UE, the UE may transmit the uplink signal directly to the eNB using the LTE technology on the band A, or to the AP using the WiFi technology on the band B. The AP forwards the uplink signal from the UE to the eNB controlling the AP.

Figure 9:
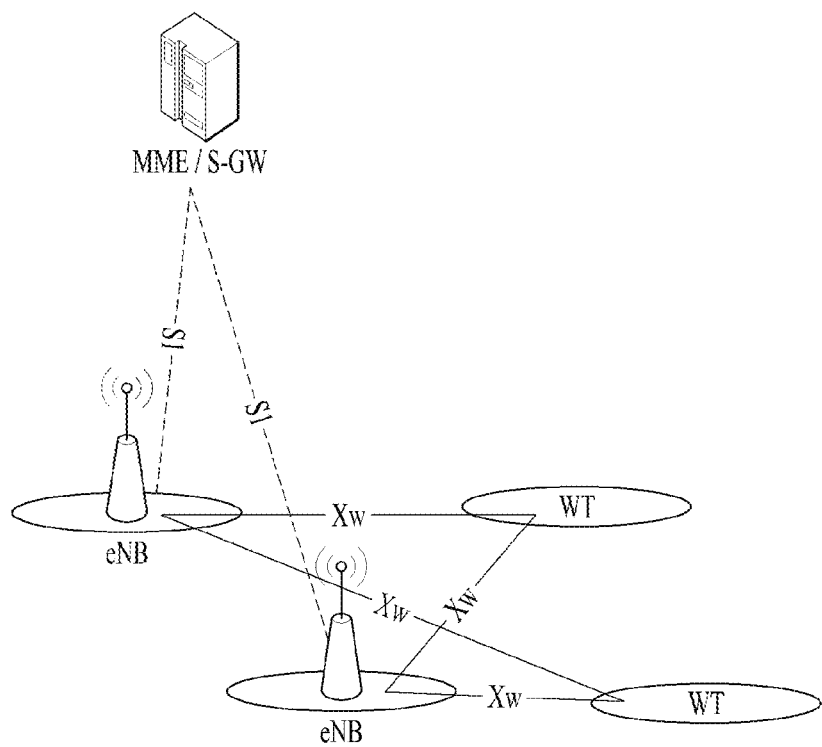
FIG. 9 illustrates the overall architecture for the non-collocated LWA scenario.

Recently LTE-WLAN aggregation (LWA) operation has been introduced in the LTE/LTE-A system. E-UTRAN supports LWA operation whereby a UE in RRC_CONNECTED is configured by the eNB to utilize radio resources of LTE and WLAN. Two scenarios are supported depending on the backhaul connection between LTE and WLAN:

non-collocated LWA scenario for a non-ideal backhaul;
collocated LWA scenario for an ideal/internal backhaul;

FIG. 9 illustrates the overall architecture for the non-collocated LWA scenario where the WLAN Termination (WT) terminates the Xw interface for WLAN.

In the non-collocated LWA scenario, the eNB is connected to one or more WTs via an Xw interface. In the collocated LWA scenario the interface between LTE and WLAN is up to implementation. For LWA, the only required interfaces to the Core Network are S1-U and S1-MME which are terminated at the eNB. No Core Network interface is required for the WLAN. A WT is a logical node and 3GPP does not specify where it is implemented.

In the carrier aggregation, DC, LAA, and the LWA, the eNB(s) participating in the carrier aggregation, DC, LAA or LWA knows whether a UE is configured with the carrier aggregation, DC, LAA or LWA, since the entity that has configured the UE with the carrier aggregation, DC, LAA or LWA is the eNB(s), or since there is an interface between the eNB(s).

Figure 10:
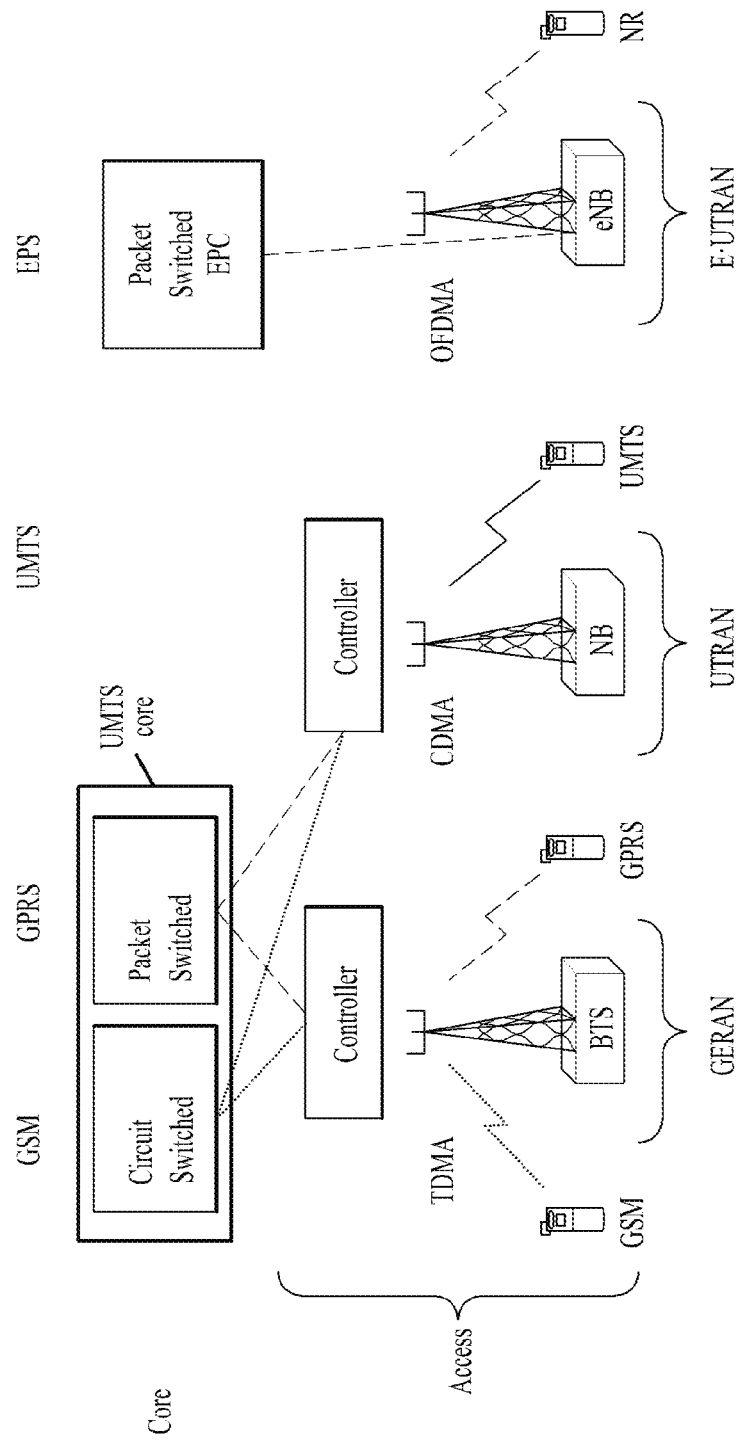
FIG. 10 illustrates the network solutions from GSM to LTE.

FIG. 10 illustrates the network solutions from GSM to LTE.

GSM was developed to carry real time services, in a circuit switched manner (dotted line in FIG. 10) with data services only possible over a circuit switched modem connection, with very low data rates. The first step towards an IP based packet switched (broken line in FIG. 10) solution was taken with the evolution of GSM to GPRS, using the same air interface and access method, TDMA (Time Division Multiple Access).

To reach higher data rates in UMTS (Universal Mobile Terrestrial System) a new access technology WCDMA (Wideband Code Division Multiple Access) was developed. The access network in UMTS emulates a circuit switched connection for real time services and a packet switched connection for datacom services (solid line in FIG. 10). In UMTS the IP address is allocated to the UE when a datacom service is established and released when the service is released. Incoming datacom services are therefore still relying upon the circuit switched core for paging.

The EPS is purely IP based. Both real time services and datacom services will be carried by the IP protocol. The IP address is allocated when the mobile is switched on and released when switched off. The new access solution, LTE, is based on OFDMA (Orthogonal Frequency Division Multiple Access) and in combination with higher order modulation (up to 64QAM), large bandwidths (up to 20 MHz) and spatial multiplexing in the downlink (up to 4×4) high data rates can be achieved. The highest theoretical peak data rate on the transport channel is 75 Mbps in the uplink, and in the downlink, using spatial multiplexing, the rate can be as high as 300 Mbps.

In the meantime, the users want smooth and continuous communications irrespective of the movement of their UEs. A method that can satisfy these needs of users is called handover. Therefore, each system proposes a method for supporting handover due to UE's movement. Handover may occur between BSs in the same system, but it can also occur between heterogeneous systems. For example, handover may occur between E-UTRAN and UTRAN. Handover between heterogeneous systems is called inter-system handover or inter-system mobility. The Existing communication systems had one-to-one relationship between RAN and core network technology related to radio access technology (RAT). For example, if the radio interface is UTRAN, the UE can always consider that there is the UMTS core behind the UTRAN. Similarly, if the radio interface is LTE, the UE can regard that the core to which the LTE is connected is the EPC. Also, if the RAT of the cell serving the UE is 3G technology the UTRAN is regarded as the access node (AN) of the cell, and if the RAT of the cell serving the UE is E-UTRA the E-UTRAN is regarded as the AN of the cell. That is, the conventional base stations do not support a plurality of RATs, and if RATs are different then BSs supporting the different RATs also differ. Therefore, in the conventional cellular network technology, since a single communication system supports a single access technology, if there is a handover between RATs (e.g., GERAN, UTRAN, E-UTRAN), corresponding systems (e.g., GPRS A/Gb, GPRS Iu, EPS, S1) also changed accordingly (see "Inter RAT handover" in 3GPP TS 23.401).

Wireless communication technology has been developed up to LTE based on TDMA/WCDMA, but the needs and expectations of users and operators are continuously increasing. In addition, as other wireless access technologies are being developed one by one, evolution to new technology is required in order to have future competitiveness. In the future wireless communication technology, the reduction of cost per bit, the improvement of service availability, and the use of flexible frequency bands require simple structure, open interface, proper power consumption of UEs, etc. are required. As a result, standardization work is in progress to provide further improved mobile communication services for EPS systems based on the current LTE and EPC. Hereinafter, the next generation mobile communication system will be referred to as the NextGen system or NR system, the core of the NR system will be referred to as the next generation core (NGC) or SGC, the core network of the NR system will be referred to as the next core network (NCN), NextGen Core, NG CN, 5G CN or N-CN, and the radio access network and its associated radio access technology will be referred to as the next radio (NR). A frequency band in which communication using the LTE (i.e. the 4G technology) occurs in the radio interface is called an LTE cell or 4 G cell, and a frequency band in which communication using the NR (e.g. 5 G technology) occurs in the radio interface is called an NR cell or a 5G cell. Also, the next generation wireless access network is called NG RAN, N-RAN, new RAN or next RAN. In addition, the base station of E-UTRAN is called eNB, and the base station of NextGen is called gNB. The term "LTE" can be used in the same sense as radio access technology (E-UTRA).

For the 3GPP agreements, terms and/or technology on the NR system associated with the present invention, 3GPP TR 36.842, 3GPP TR 38.801, 3GPP TR 38.804, 3GPP TR 23.779 and 3GPP TS 38.xxx series may be referenced.

In the NR system, introducing a mode referred to as "dual attach" or "dual registration" is under discussion. When in dual coverage (i.e. both under GERAN/UTRAN/EUTRAN access and under NG RAN access), a UE may operate in "dual attach" or "dual registration" mode. In other words, when in dual coverage (i.e. both under GERAN/UTRAN/ EUTRAN access and under NG RAN access), a UE may be simultaneously attached over two independent systems, and uses two independent Mobility Management (MM) and Session Management (SM) contexts. At the lower layers, the UE may be operating in either "single radio" or "dual radio" mode, depending on the support that will be defined by the RAN working groups. In the present invention, the term "dual attach" or "dual registration" can be used to refer to an operation where a given UE stays registered in two different radio access technologies in parallel. The two radio access technologies do not have to be tightly interworked with each other by using a specific interface (i.e. NGx). The dual registration is beneficial to minimize signaling overhead & complexity both on the UE and the EPC/NGC, and it would result in the minor impact on the existing eNB/EPC for the interworking.

Figure 11:
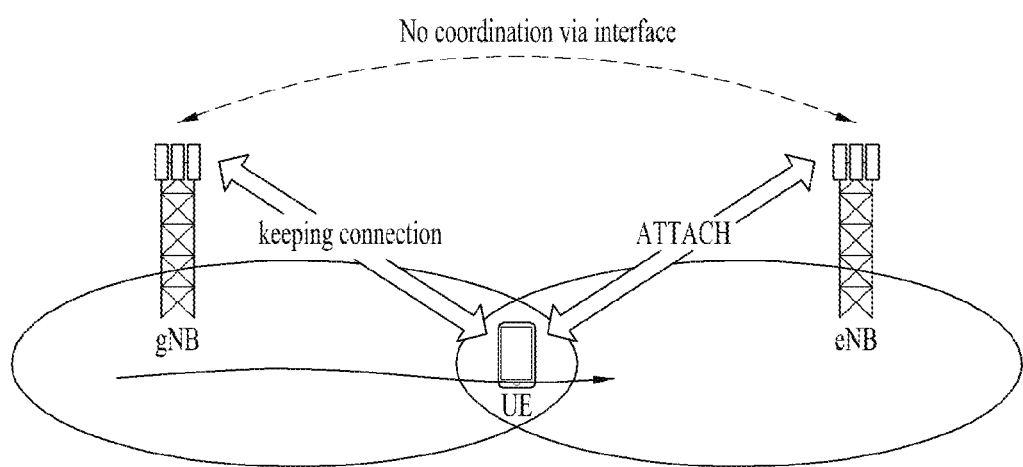
FIG. 11 illustrates an example of a UE in dual registration with dual radio.

FIG. 11 illustrates an example of a UE in dual registration with dual radio.

The dual registration can be used to support the inter-RAT mobility between NR and LTE. A connected UE can move from NR to LTE and vice versa. In the scenario that a UE moves from NR to LTE, based on the inter-RAT measurements and other information (e.g. UE capability), a gNB configures the dual registration for the UE. It means that the UE performs an ATTACH procedure to the target system. Then, the gNB does not have to coordinate it with the LTE system. This would be a main difference from the conventional inter-RAT handover approach requiring the coordination via the interface. During the initial attachment to LTE, the UE may still keep its connection to NR, as shown in FIG. 11.

New signaling used to trigger the dual registration may be further defined or introduced. Except for it, the existing procedures, e.g. measurement configuration and establishment, may be reused. Compared to the conventional handover procedure, the main difference is that the source RAT does not provide any mobility configuration associated with the setup in the target RAT. Instead, a UE may performs an ATTACH procedure to the target RAT, and acquire directly the required configuration, e.g., from system information. Even though the source RAT may provide some limited configuration to the UE as an optimization, at least the source RAT may not have to obtain the configuration from the target RAT via a specific backhaul interface.

The dual registration can be also used to support the inter-RAT aggregation between NR and LTE. The source RAT can initiate the dual registration for UE throughput enhancement, but need not manage the radio resources assigned in different RAT. Without any coordination, two RATs independently schedule the data to a UE.

Considering an inter-RAT mobility scenario that a UE moves from a source RAT to a target RAT, the source RAT configures one of the following options as shown in FIG. 3. If there is a coordination interface between two RATs, the source RAT can configure an inter-RAT handover to the UE. If not, the source RAT needs to configure to initiate the ATTACH procedure toward the target RAT for registration purpose. Consequently, the UE gets in dual registration. If the dual-registered UE supports dual radio, it keeps the parallel connections to two RATs. Otherwise, it cannot communicate with two RATs simultaneously. Accordingly, the UE may need to share its single radio in time division multiplexing while still keeping the parallel connections to two RATs, or may have to release the connection with the source RAT.

According to discussions on the dual registration so far, when a UE supporting the dual registration (i.e., dual attach) receives an instruction to perform the dual registration from a network, the UE can perform the dual registration to support different RAT systems simultaneously. In this case, if there is no interface between the two RAT systems, the last registered system could not know that the UE is in dual registration. Also, there is no method that, if a UE the UE has the single registration again, a remaining system could know that the UE is in single registration.

In the present invention, "source system" refers to the first registered system of a UE before having second registration with other system, or the system with which a UE remains registered after disconnecting/detaching from the other system(s). In the present invention, "target system" refers to the second registered system of the UE with which the UE gets to have registration (second registration) after having the first registration, or the system from which the UE has to disconnect/detach while remaining registered with the other system. If the UE is in dual registration, the first registration and the second registration exist simultaneously.

The present invention proposes that a UE being able to support the dual registration indicate that UE already has the registration with the source system when UE registers with the target system. It is further proposed that the UE indicate that the UE disconnects or detaches from the other system when the UE transitions to single registration from the dual registration.

During the dual registration procedure, it is indicated to the target system that the UE being able to support the dual registration has registration with the source system. The dual registration may be triggered by the source system, or by the UE's decision.

Figure 12:
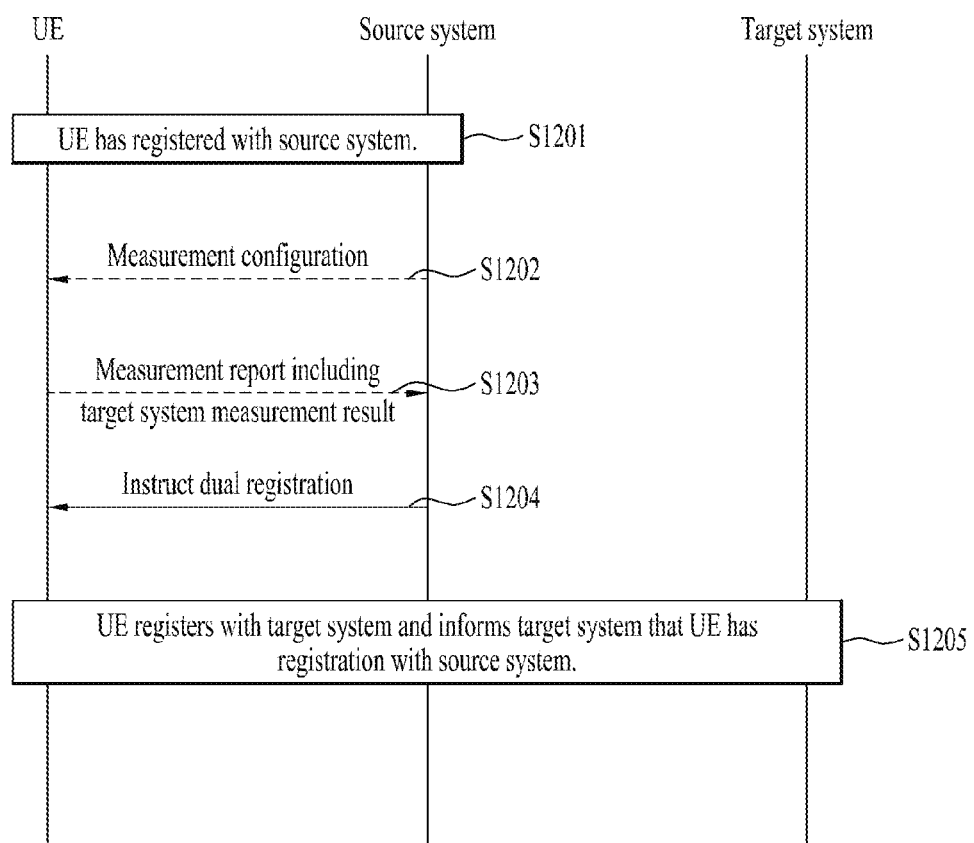
FIG. 12 illustrates an example of the procedure for dual registration according to the present invention.

FIG. 12 illustrates an example of the procedure for dual registration according to the present invention. In FIG. 12, a UE indicates UE's registration with a source system to a target system when the UE receives instruction to register with the target system.

S1201. Initially, a UE that can support the dual registration has registration with the source system.

S1202. The source system sends measurement configuration to the UE for measuring the target system.

S1203. The UE measures the target system and sends a measurement report including measurement result of the target system to the source system.

S1204. The source system may instruct the dual registration. In other words, the source system may send a command to the UE to register with the target system while maintaining the registration with the source system.

S1205. The UE registers with the target system and informs the target system that the UE has the registration with the source system.

Figure 13:
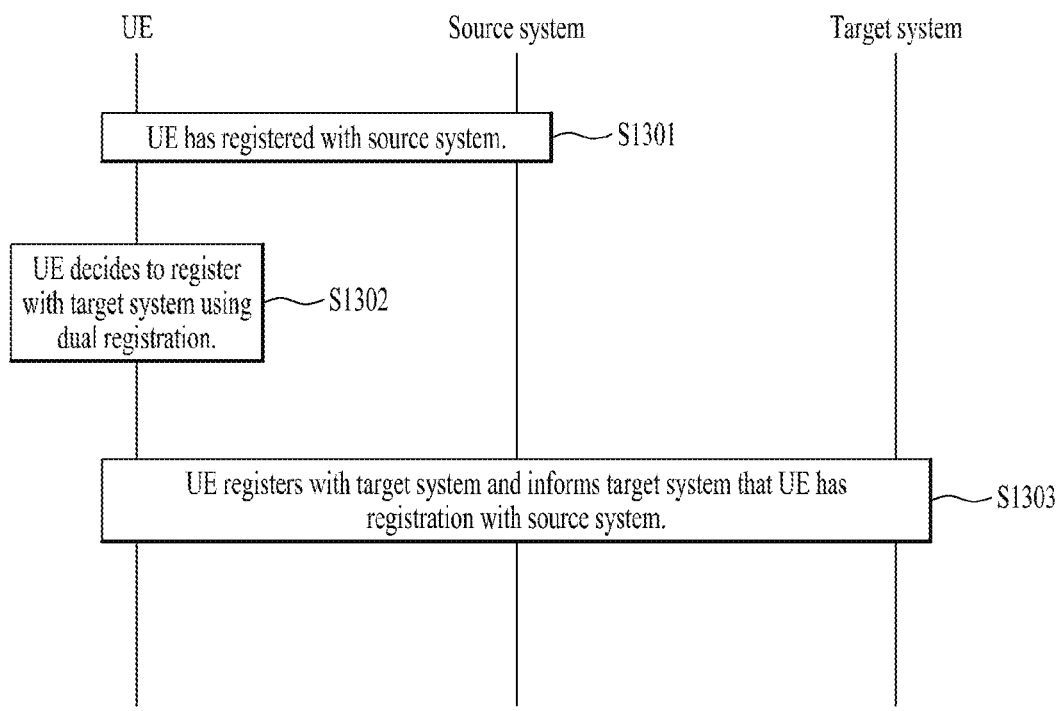
FIG. 13 illustrates another example of the procedure for dual registration according to the present invention.

FIG. 13 illustrates another example of the procedure for dual registration according to the present invention. In FIG. 13, a UE indicates UE's registration with the source system to the target system when the UE decides to register with the target system using the dual registration.

S1301. Initially, a UE that can support the dual registration has registration with the source system.

S1302. The UE may decide to register with the target system using the dual registration. In other words, the UE makes a decision to have additional registration while maintaining the registration with the source system.

S1303. The UE registers with the target system and informs the target system that the UE has the registration with the source system.

When a UE has single registration again from the dual registration, i.e., when the UE disconnects one of the dual registration, the UE may indicate to the connected system that UE disconnects or detaches from the other system. In other words, the UE informs a remaining system that the UE disconnects or detaches from the other system when the UE transitions from dual registration to single registration.

During the disconnecting/detaching procedure, it is indicated to the remaining system that the UE leaves the other system. The procedure for disconnecting or detaching from the other system may be triggered by the remaining system, or by the UE's decision.

Figure 14:
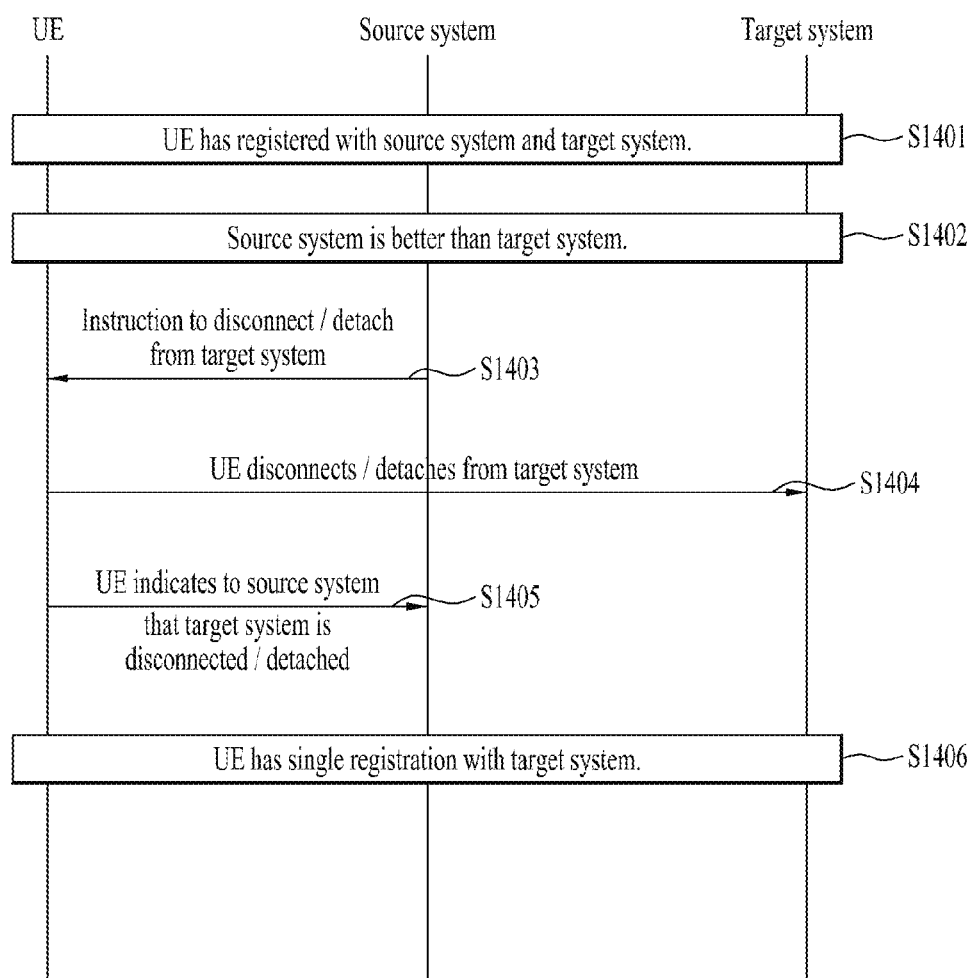
FIG. 14 illustrates an example of the procedure for disconnecting or detaching from a system while remains registered with another system according to the present invention.

FIG. 14 illustrates an example of the procedure for disconnecting or detaching from a system while remains registered with another system according to the present invention. In FIG. 14, a UE in dual registration disconnects/detaches from a target system when the UE receives a disconnecting/detaching instruction from a source system.

S1401. Initially, a UE has registered with two systems. In other words, a UE is in dual registration with the two systems.

S1402. The UE moves to some area that (radio) condition of one of the two systems (source system) is better than that of the other one (target system).

S1403. The source system may instruct the UE to disconnect or detach from the target system.

S1404. The UE disconnects or detaches from the target system.

S1405. The UE indicates to the source system that the UE disconnects or detaches from the target system.

S1406. The UE is in single registration with the source system.

Figure 15:
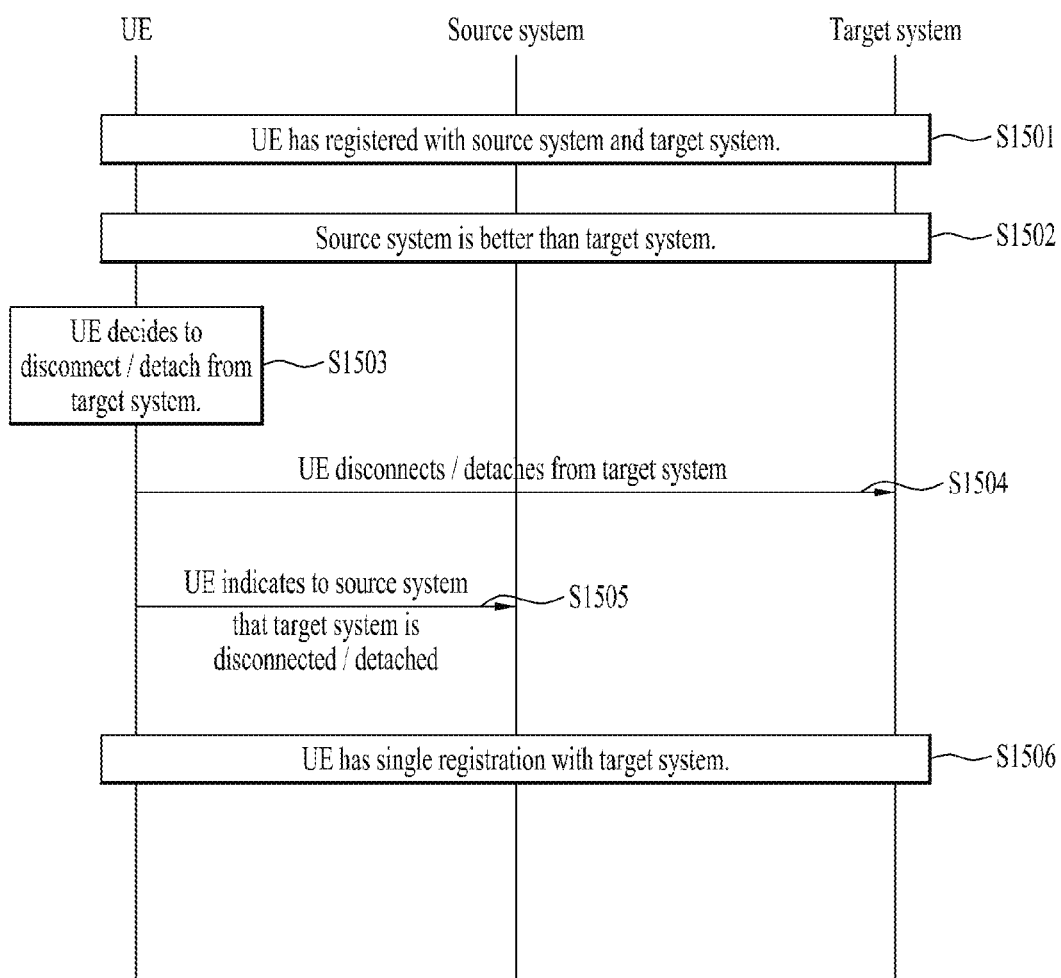
FIG. 15 illustrates another example of the procedure for disconnecting or detaching from a system while remains registered with another system according to the present invention.

FIG. 15 illustrates another example of the procedure for disconnecting or detaching from a system while remains registered with another system according to the present invention. In FIG. 15, a UE in dual registration with two systems disconnects/detaches from one (target system) of the two systems when the UE decides to disconnect or detach from the target system.

S1501. Initially, a UE has registered with two systems. In other words, a UE is in dual registration with the two systems.

S1502. The UE moves to some area that condition of one of the two systems (source system) is better than that of the other one (target system).

S1503. The UE may decide to disconnect or detach from the target system.

S1504. The UE disconnects or detaches from the target system.

S1505. The UE indicates to the source system that the UE disconnects or detaches from the target system.

S1506. The UE is in single registration with the source system.

In FIG. 14 and FIG. 15, UE's disconnecting or detaching from one system can be triggered by a network, or by the UE's decision. The disconnected or detached system may be the source system or the target system. S1405 or S1505 may be performed before the UE disconnects or detaches from another system. In other words, the order of S1405 and S1406 may be changed, and the order of S1505 and S1506 may be changed.

In the conventional DC or LWA, one master node (i.e. master BS) controls the registration or detach procedure for the UE configured with DC or LWA. Unlike the conventional DC or LWA, in the dual registration of the present invention, a network node (e.g. eNB/gNB) provides the UE with information about another node (e.g. gNB/eNB) which is not controlled by or has no interface with the network node. The present invention has the following advantageous effects.

It may be required that user plane data of the RAT (source RAT) of the source system be forwarded to the RAT (target RAT) of the target system (e.g. because of the bad radio condition of the source RAT) after the UE has registered with the target system. In this case, if there is any interface between the eNB and the gNB or between the MME of the EPC and the access and mobility management function (AMF) of the NGC, the user plane data can be forwarded via the interface. However, the dual registration is considered for the loose interworking case, and there would be no interface between the MME and the AMF. According to the present invention, if the UE informs the target system (i.e. core network of the target system) that the UE has registered with the source system, the core of the target system (e.g. EPC or NGC) can recognize that the UE performs inter-RAT mobility and may fetch the user plane data from the source RAT.

Besides, if there is no interface between two systems with which the UE registered, at least one (target system) of the two systems could not properly recognize why scheduling errors occur or why power control for the UE cannot be performed as they intended. For example, if the UE has registered with the two systems and transmits respective uplink signals to the two systems simultaneously, there is possibility that the UE transmits the respective uplink signals at the power different from the power controlled by the target system. It could worsen the error probability of the uplink signal to the target system, but the target system could not change scheduling for the UE or power adjustment value for the UE, appropriately, since the target system could not recognize the fact that the UE is in registration with the source system. According to the present invention, if the UE informs the target system (i.e. core network of the target system) that the UE has registered with the source system, the core of the target system may assist its BS to control transmission power of the UE appropriately by informing the BS that the UE has registered with the source system.

Figure 16:
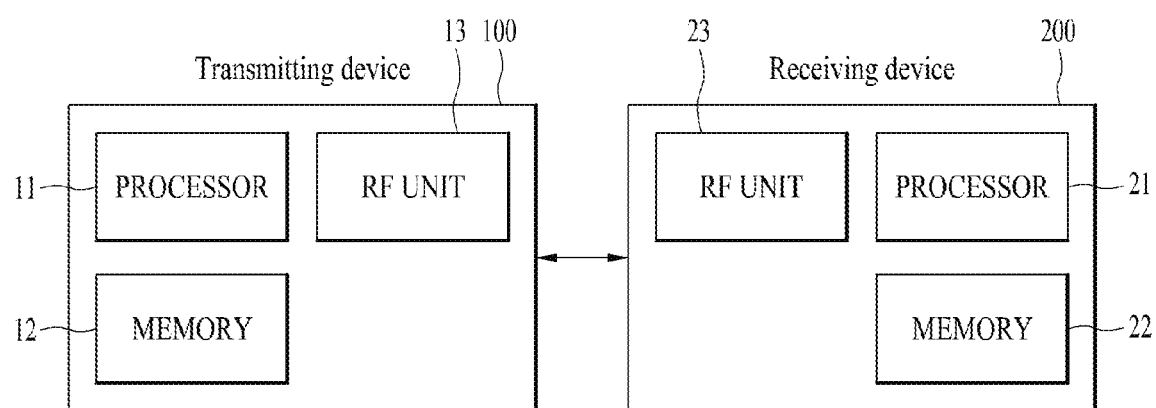
FIG. 16 is a block diagram illustrating elements of a transmitting device 100 and a receiving device 200 for implementing the present invention.

FIG. 16 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The UE processor may control the UE to register with a core network of a second system independent of a first system while maintaining registration with a core network of the first system. For example, the UE processor may control the UE RF unit to transmit and/or receive messages or information required to register the UE at the second system. The UE processor may control the UE RF unit to transmit, to the second system, first information indicating that the UE has the registration with the first system when connecting to the second system (e.g., when establishing an RRC connection with the second system). One of the first and second systems may be a LTE system using a first radio access technology (RAT), and the other one may be a new RAT system using a second RAT different from the first RAT. The UE processor may control the UE RF unit to receive, from the first system, a command for the UE to register in the second system while maintaining registration with the core network of the first system. The UE processor may register with the core network of the second system based on the command 10. The UE processor may decide to register with the core network of the second system in addition to the registration with the core network of the first system. The UE processor may control the UE RF unit to transmit, to one of the first and second systems, second information indicating that the UE detaches from the other one of the first and second systems when the UE detaches from the other one of the first and second systems. The UE processor may control the UE RF unit to receive, from the one of the first and second systems, a detach command for the UE to detach from the other one of the first and second systems. Alternatively, the UE processor may control the UE RF unit to receive, from the other one of the first and second systems, a detach command for the UE to detach from the other one of the first and second systems. Alternatively, the UE processor may decide to detach from the other one of the first and second systems. The UE processor may detach from the other one of the first and second systems based on the detach command or its own decision. The UE processor may perform detaching from the other one of the first and second systems by controlling the UE RF unit to transmit/receive messages/information required to detach from the other one of the first and second systems.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The embodiments of the present invention are applicable to a network node (e.g., BS), a UE, or other devices in a wireless communication system.

What is claimed is:

1. A method for registering, by a user equipment (UE), with a wireless communication system, the method comprising:

performing, by the UE, a registration in a first system;

performing, by the UE, a registration in a second system while maintaining the registration in the first system;

transmitting, by the UE to the second system, first information indicating that the UE has the registration in the first system when performing the registration in the second system; and operating, by the UE, in a dual registration mode, wherein the UE in the dual registration mode has the registration in the first system and the registration in the second system, wherein the second system does not have a core network interface with the first system, and wherein one of the first and second systems is an evolved packet core (EPC) system (EPS) using a long term evolution (LTE) radio access technology (RAT), and the other one of the first and second systems is a next generation core system using a new RAT different from the LTE RAT.

2. The method according to claim 1, further comprising:
receiving, by the UE from the first system, a command for the UE to perform the registration in the second system while maintaining the registration in the first system; and performing, by the UE, the registration in the second system based on the command.

3. The method according to claim 1, further comprising:
deciding, by the UE, to perform the registration in the second system while maintain the registration of the first system.

4. The method according to claim 1, further comprising:
transmitting, by the UE to one of the first and second systems, second information indicating that the UE detaches from the other one of the first and second systems when the UE detaches from the other one of the first and second systems.

5. The method according to claim 4, further comprising:
receiving, by the UE from the one of the first and second systems, a detach command for the UE to detach from the other one of the first and second systems; and detaching, by the UE, from the other one of the first and second systems based on the detach command.

6. The method according to claim 4, further comprising:
receiving, by the UE from the other one of the first and second systems, a detach command for the UE to detach from the other one of the first and second systems; and detaching, by the UE, from the other one of the first and second systems based on the detach command.

7. The method according to claim 4, further comprising:
deciding, by the UE, to detach from the other one of the first and second systems.

8. A user equipment (UE) for registering with a wireless communication system, the UE comprising:
a radio frequency (RF) unit including a transceiver, and
a processor configured to control the RF unit, the processor configured to:
control the RF unit to perform a registration in a first system;
control the RF unit to perform a registration in a second system, while maintaining the registration in the first system; and
control the RF unit to transmit, to the second system, first information indicating that the UE has the registration in the first system when performing the registration in the second system, and
operate in a dual registration mode,
wherein the UE in the dual registration mode has the registration in the first system and the registration in the second system,
wherein the second system does not have a core network interface with the first system, and
wherein one of the first and second systems is an evolved packet core (EPC) system (EPS) using a long term evolution (LTE)radio access technology (RAT), and the other one of the first and second systems is a next generation core system using a new RAT different from the LTE RAT.

9. The UE according to claim 8, wherein the processor is configured to:
control the RF unit to receive, from the first system, a command for the UE to perform the registration in the second system while maintaining the registration in the first system; and
control the RF unit to perform the registration the second system based on the command.

10. The UE according to claim 8, wherein the processor is configured to:
decide to perform the registration in the second system while maintaining the registration with the core network of the first system.

11. The UE according to claim 8, wherein the processor is configured to:
control the RF unit to transmit, to one of the first and second systems, second information indicating that the UE detaches from the other one of the first and second systems when the UE detaches from the other one of the first and second systems.

12. The UE according to claim 11, wherein the processor is configured to:
control the RF unit to receive, from the one of the first and second systems, a detach command for the UE to detach from the other one of the first and second systems; and
detach from the other one of the first and second systems based on the detach command.

13. The UE according to claim 11, wherein the processor is configured to:
control the RF unit to receive, from the other one of the first and second systems, a detach command for the UE to detach from the other one of the first and second systems; and
detach from the other one of the first and second systems based on the detach command.

14. The UE according to claim 11, wherein the processor is configured to:
decide to detach from the other one of the first and second systems.

* * * * *